United States Patent [19]
Takahashi et al.

[11] Patent Number: 5,465,292
[45] Date of Patent: Nov. 7, 1995

[54] TRADING TELEPHONE

[75] Inventors: Toshie Takahashi; Takashi Sato; Toshimi Kurumada; Yoshiyuki Kokubun, all of Fukushima, Japan

[73] Assignee: Hitachi Telecom Technologies, Ltd., Fukushima, Japan

[21] Appl. No.: 123,247

[22] Filed: Sep. 20, 1993

[51] Int. Cl.⁶ .................................................. H64M 1/00
[52] U.S. Cl. ........................................ 379/164; 375/165
[58] Field of Search .................................... 379/156, 157, 379/164, 165, 188, 160, 166, 167, 428

[56] References Cited

U.S. PATENT DOCUMENTS

| | | | |
|---|---|---|---|
| 4,926,470 | 5/1990 | Sanford | 379/188 X |
| 5,119,413 | 6/1992 | Okumura et al. | 379/157 X |
| 5,153,908 | 10/1992 | Kakizawa | 379/157 |
| 5,182,768 | 1/1993 | Nakano et al. | 379/428 X |
| 5,230,017 | 7/1993 | Alexander | 379/164 X |
| 5,245,653 | 9/1993 | Izumi | 379/157 |
| 5,299,256 | 3/1994 | Hu | 379/157 X |

Primary Examiner—Stephen Chin
Assistant Examiner—Paul Loomis
Attorney, Agent, or Firm—Antonelli, Terry, Stout & Kraus

[57] ABSTRACT

A trading telephone unit of a trading telephone system includes three display devices and control keys on the trading telephone unit. A first display device is provided at an upper left side of the unit having a function keyboard and a ten-key keyboard provided thereunder. On the right side of the unit, two display devices are provided in parallel with one of the two display devices being a second display device having, for example, twenty line selecting keys and a third display device having fifteen line selecting keys and four incoming line selecting keys, thereby enabling the unit to indicate thirty-five lines at once. The trading telephone includes pagenation memory having, for example, ten pages of memory with each page carrying thirty-five line names and dialing numbers. By user request, any one of the pages is called on the second and third display devices with the present page number being displayed on the third display device and on-hold line status information being displayed on the first display device.

20 Claims, 12 Drawing Sheets

TRADING TELEPHONE

BACKGROUND OF THE INVENTION

This invention related to multi-line telephone communications systems having one or more telephone units of which each provides access to several telephone lines and visibly indicates the status of each such line.

Multiple-line key telephones, sometimes referred to as "trading telephone", are widely used in rapid communications networks such as trading operations in banks, brokerage houses and other financial institutions. Telephones of this type provide direct access to several outside lines with the simple depression of a single key on the telephone. Dialing is unnecessary. Each telephone unit, also referred to as a telephone station, may be capable of selecting any of several-handed different lines, and should at the same time provide all normal telephone functions, i.e., dialing, ringing, hold, etc. One essential requirement is that each telephone station furnish an indication of the present status of each of the lines accessible at the particular station. This indication usually takes the form of a continuously lighted key for a "busy" line, a flashing key for a line on "hold" or for a "ring" on an incoming call, and a non-lighted key for a free line. In addition, the station should have the capability of indicating which line the user has picked up.

By combining the push button with the display, more information could be offered to the user visually.

The user is able to know the name of the caller of the incoming line on hold by the figures on the display.

A trading system having display is indicated in U.S. Pat. No. 4,998,275, U.S. Pat. No. 5,046,086, U.S. Pat. No. Des. 313,601, U.S. Pat. No. Des. 313,602, U.S. Pat. No. Des. 313,600, and U.S. Pat. No. Des. 325,738.

SUMMARY OF THE INVENTION

The present invention provides a trading telephone having pagination means. This trading telephone is provided with three display devices.

The first display device is used for the on-hold incoming lines status information. The second and the third display device is each provided with twenty push button line selecting keys.

On the second display device, twenty lines are indicated and could be selected by pushing the corresponding line keys.

On the third display device, fifteen lines are indicated and could be accessed by pushing the corresponding line keys.

Four of the divided sectors of the third display are provided for the incoming lines memorized in the other pages.

When one of the on-hold incoming lines is picked up by pushing the corresponding line key, its information will be transferred to the first display.

This trading telephone is installed with ten pages worth of memory as a basic pagination means. By paging any one of ten pages, the user can access to any one of 350 different lines with ease. The page number now showing on the second and third display device is indicated on the last segment of the third display device.

By providing a memory card, the capacity of paging means can be expanded up to 1400 calls.

Hands free voice communication device deck is attached to the main deck by option. This trading telephone is also provided with multi-level password system for security.

Automatic power-off circuit is installed for saving energy and for prohibiting abuse.

DETAILED DESCRIPTION OF THE PREFERRED EMBODIMENTS STRUCTURE OF THE TRADING SYSTEM

Figure 1:
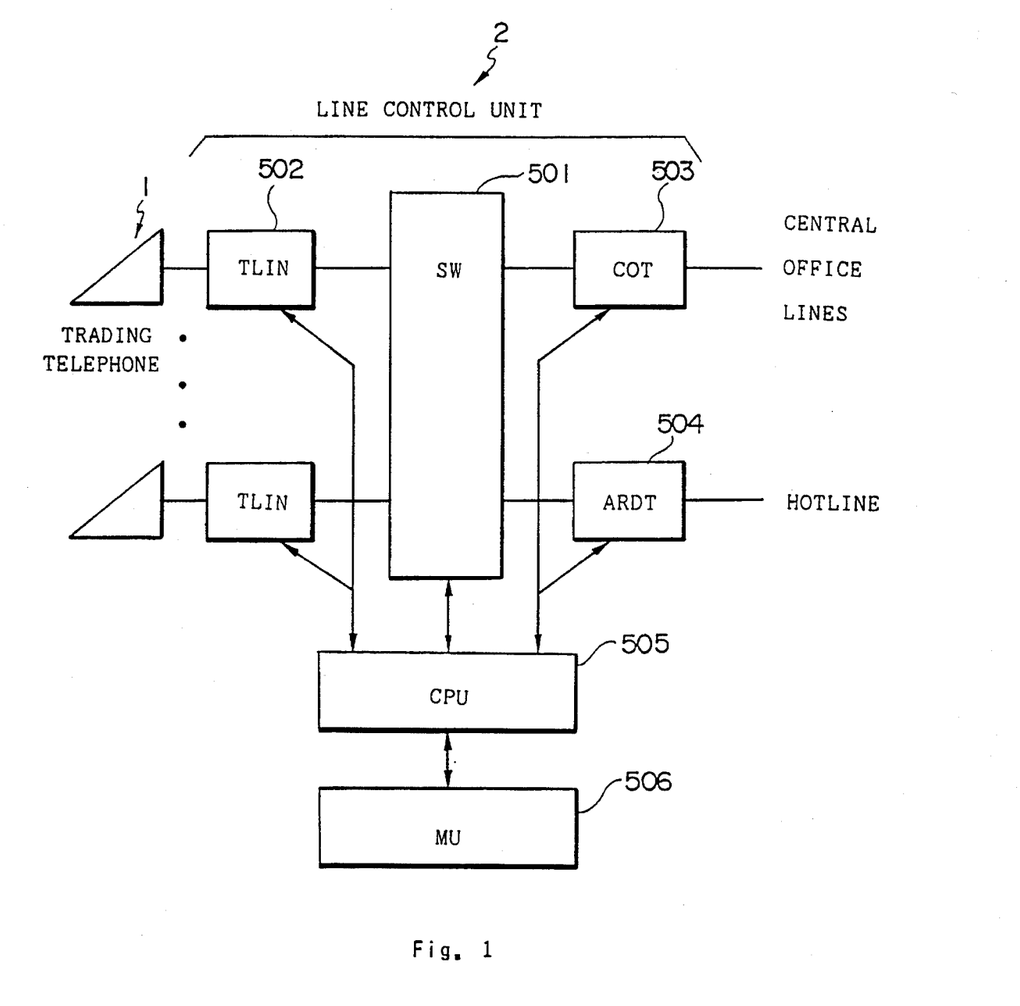
FIG. 1 is a function .block diagram showing the trading system in accordance with the invention.

FIG. 1 is a function block diagram showing the trading system in accordance with the invention. In FIG. 1, the trading system is comprised of trading telephones 1 and a line control unit 2 accomodating the trading telephones 1 for setting a speech path between the trading telephones 1 and the desired lines.

Line control unit 2 is equipped with a time switch 501. Line circuits 502 for accomodating and joint-controlling the trading telephones 1 are connected on the time switch 501. The trading telephones 1 and the line circuits 502 are joined by a cable for sending and receiving a voice signal and a call control signal. Further, central office lines are accomodated on the time switch 501, and central office trunks for connecting and controlling said lines, central office trunks 503 for joint-controlling said lines, and automatic ring down trunks 504 for accomodating the hot line and joint-control said lines are connected thereto.

Central processing unit 505 controls the whole of line control unit 2, and also performs joint-control to set a speech path between trading telephones 1 or between a trading telephone 1 and central office lines or hot lines. A memory unit 506 stores programs, data and tables in order to make the central processing unit 505 control the line control unit 2.

Further, the time switch 501, line circuits 502, central office trunks 503 and automatic ring down trunks 504 are logically connected on the central processing unit 505, and these units are all operated under the control of the central processing unit 505.

Structure of the Trading Telephone

Figure 2:
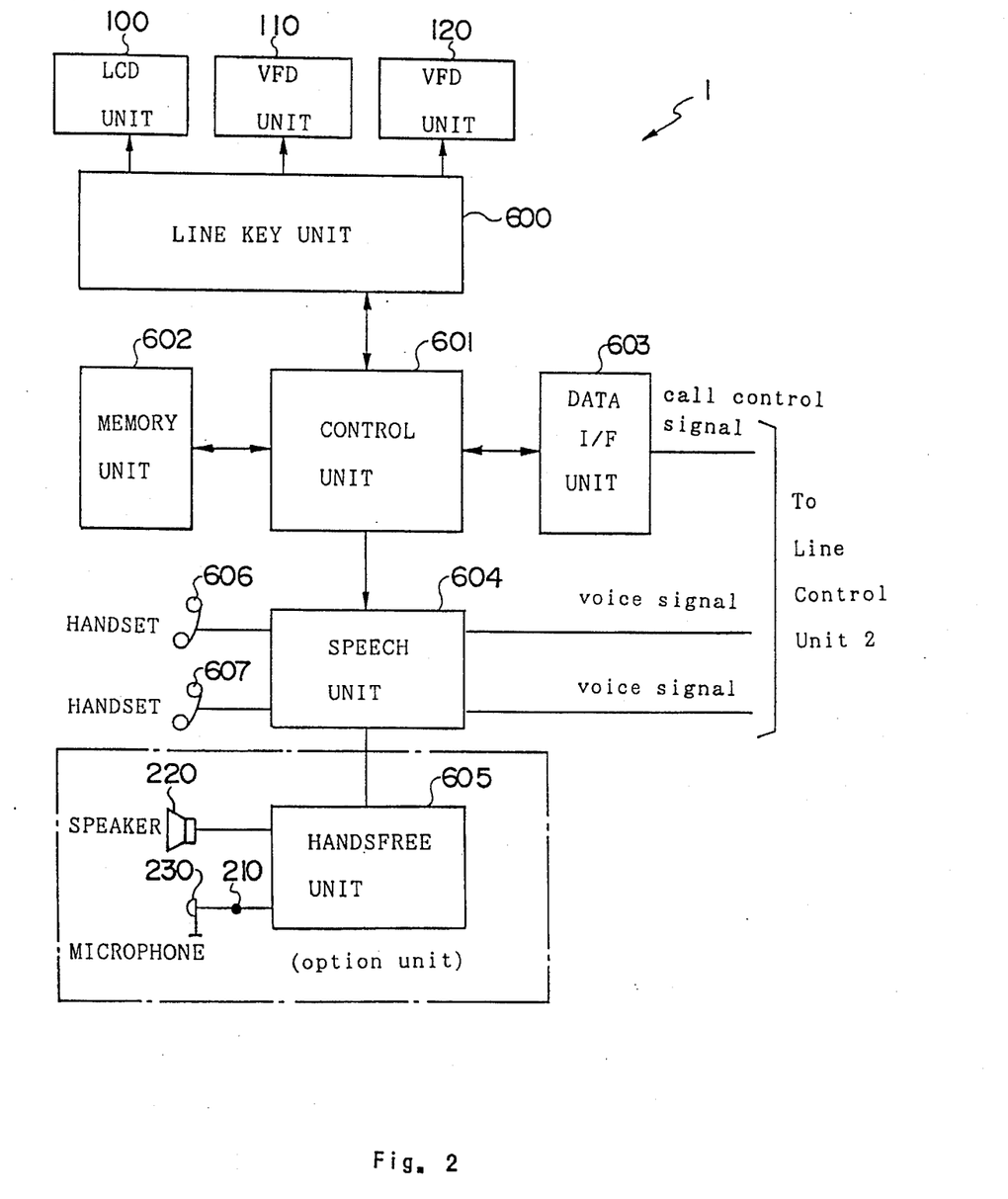
FIG. 2 is a function block diagram showing the trading telephone in accordance with the invention.

FIG. 2 is a function block diagram showing the trading telephone 1 in accordance with the invention. In FIG. 2, the trading telephone 1 is equipped with a control unit 601 which controls the whole of the trading telephone 1. The control unit 601 comprises line keys 80-n on the board surface, a function keyboard 30, ten-keyboard 40, and a control keyboard 50, 60, 70, 75, and an LED set in accordance with the line keys 80-1~80-40 on the board surface, the function keyboard 30, and the control keyboard 50, 60, 70, 75. The control unit 601 controls the key-scan of said keys and a keyboard unit 600 which controls the display of LED. A first display device 100 for monitoring the name and the dial of the person on the phone, a second display device 110 for displaying the name of the person on the phone corresponding to the line keys 80-n and the function name of the line keys 80-1~20, and a third display device 120 for displaying the name of the person on the phone corresponding to the line keys 80-21~35 and the function name of the line keys 80-36~40 are connected to the line keyboard unit 600, and the first, second and third display device 100, 110, 120 are operated under the control of the control unit 601.

A memory unit 602 stores the control program of the control unit 601, the operation condition data, and the auto dialing data.

A speech unit 604 operates under the control of the control unit 601, and sets the speech path between the left handset 606, the right handset 607 and the line control unit 2. Each of the left handset 606 and the right handset 607 is controlled independently, and the speaker can talk to different people at the same time by using the handsets.

An optional unit called the hands-free unit 605 could be connected to the speech unit 604, and a hands-free call is made possible by setting a speech path between a speaker 220, the microphone 230 and the line control unit 2 under the control of the control unit 601.

The control unit 601 is connected to the line control unit 2 through a data I/F unit 603, and the sending/receiving of the call control signal is done by this data I/F unit 603.

Figure 3:
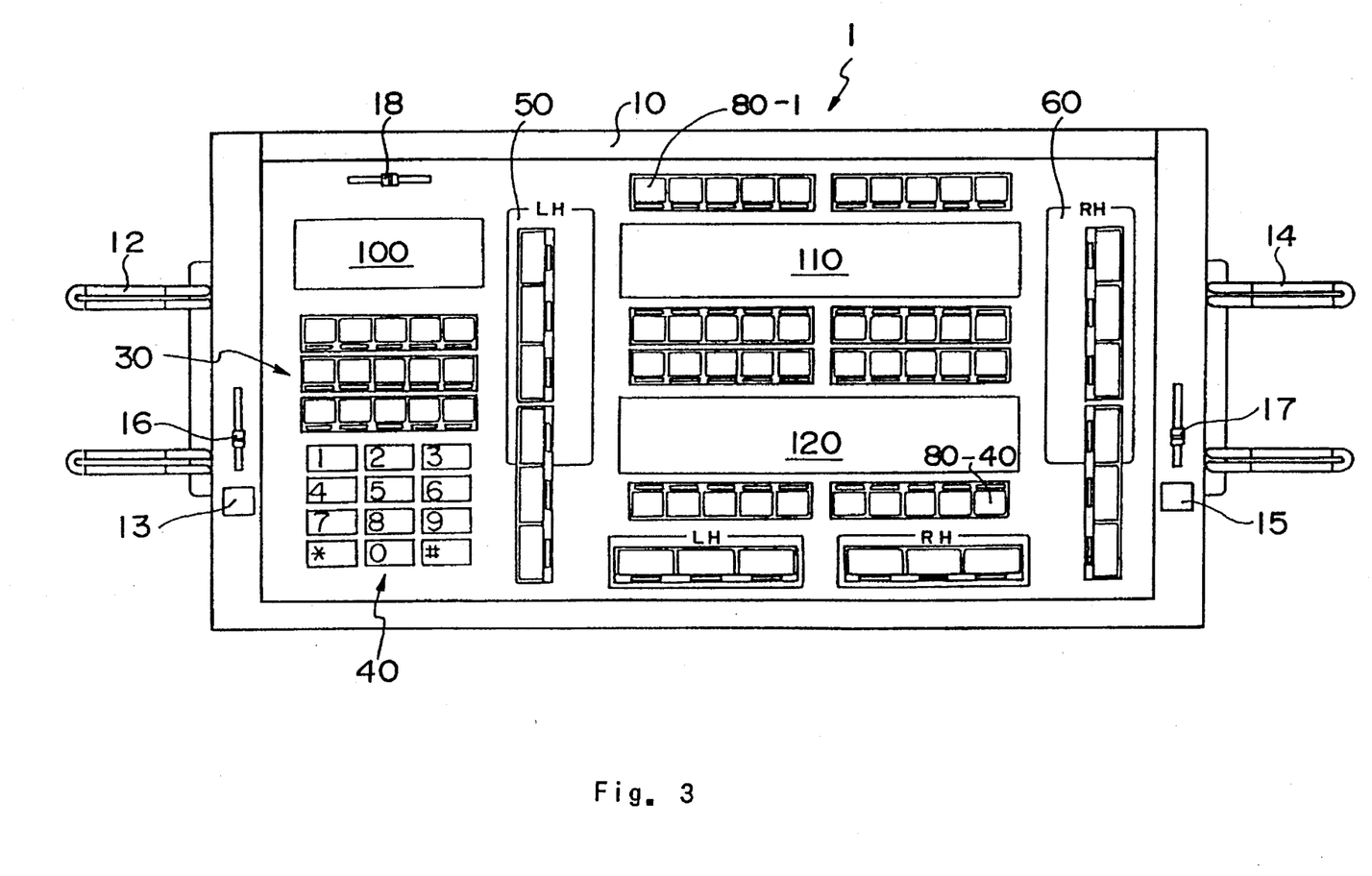
FIG. 3 is a plan view of the trading telephone in accordance with the invention.
Figure 4:
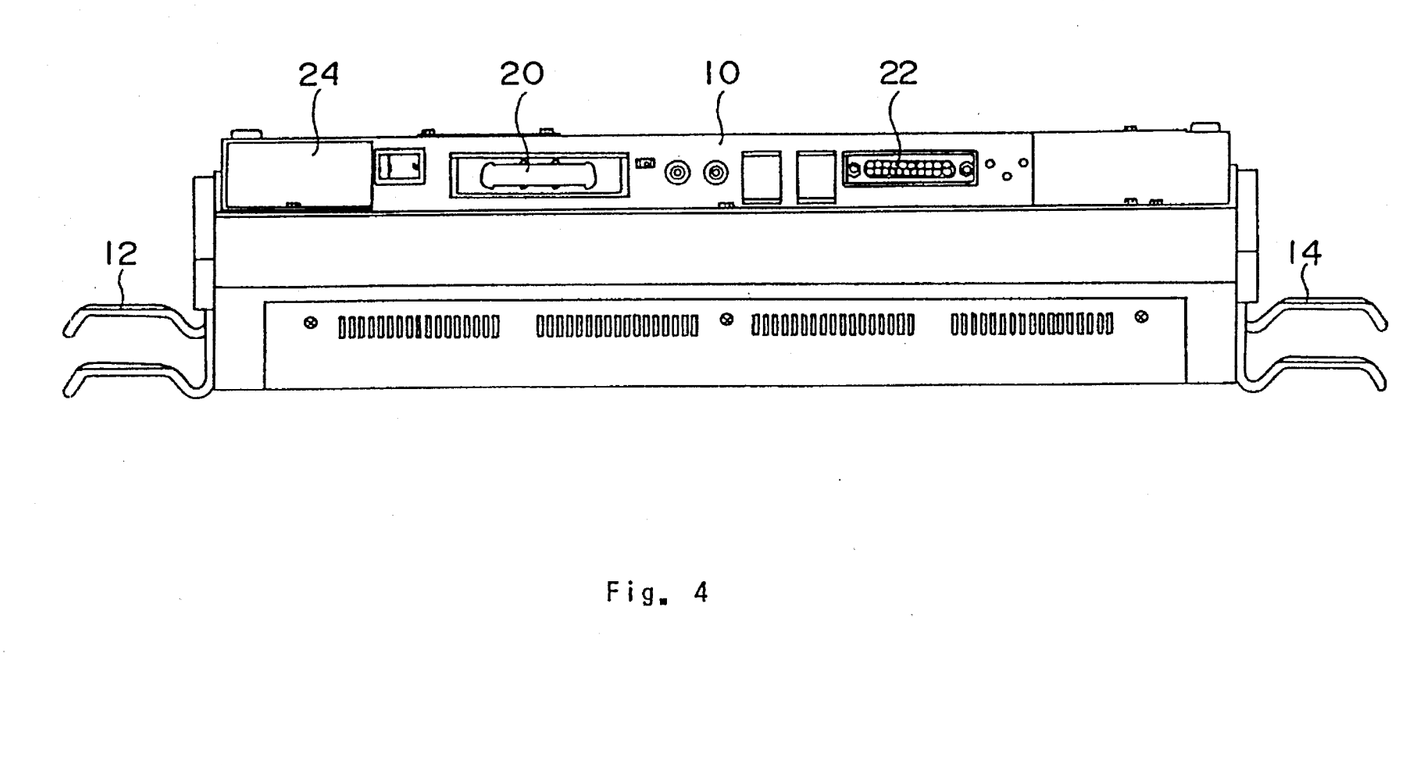
FIG. 4 is a back view of the trading telephone in accordance with the invention.
Figure 5:
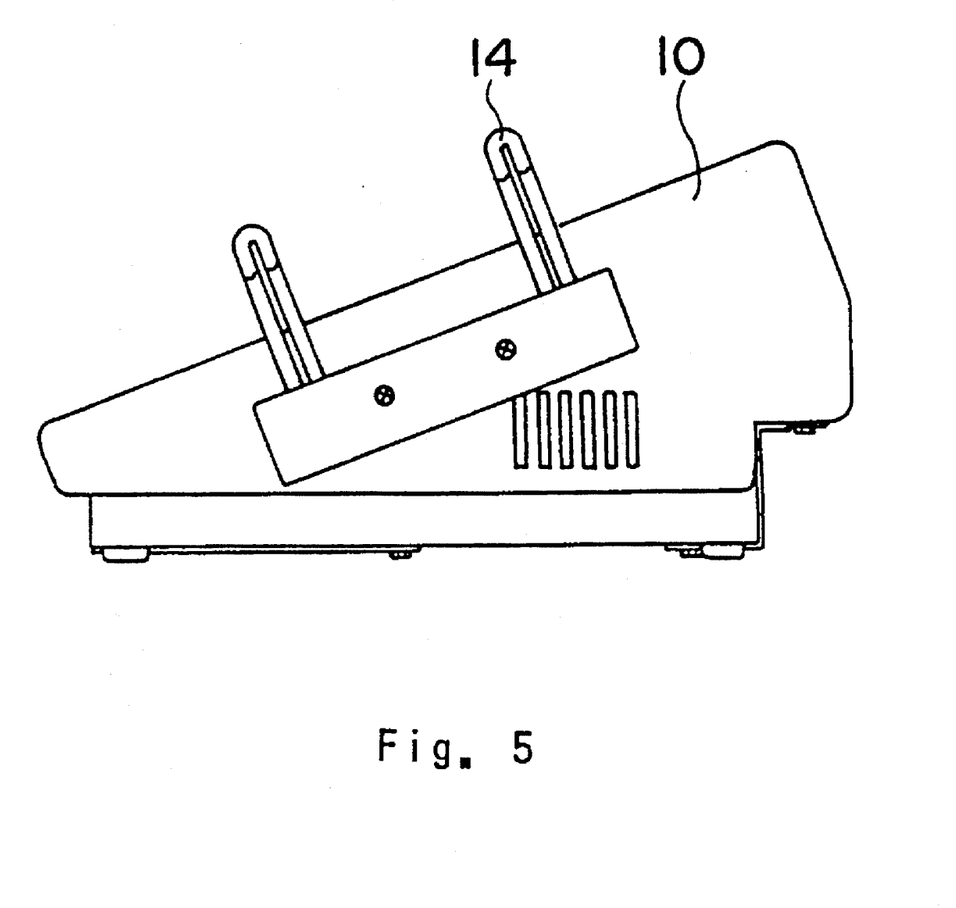
FIG. 5 is a side view of the trading telephone in accordance with the invention.
Figure 6:
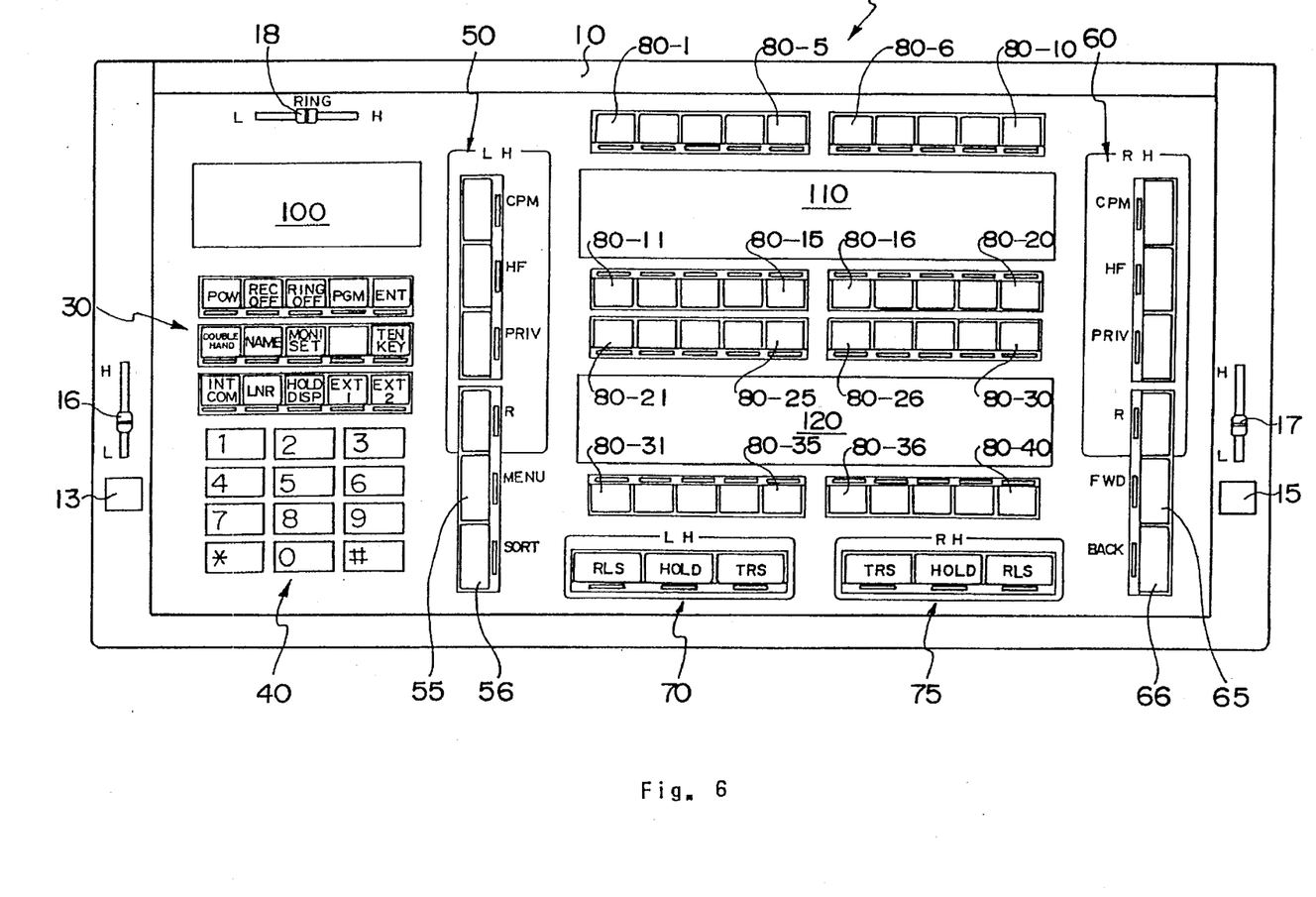
FIG. 6 is an enlarged view of the board layout of FIG. 3.

FIG. 3 is a plan view, FIG. 4 is a back view, and FIG. 5 is a side view of the trading telephone of the present invention. FIG. 6 is an enlarged view of the board layout of FIG. 3.

In trading telephone 1, a keyboard or switch and display device is installed on the upper surface of the board of housing 10. On the both sides of housing 10 are installed hooks 12, 14, where a pair of hand held telephone set (not shown) will be placed.

The cord of the left handset is put into plug 13, and the volume of the voice on the phone can be controlled by a slide switch 16.

The cord of the right handset is put into plug 15, and the volume of the voice on the phone can be controlled by a slide switch 17.

A slide switch 18 for controlling the volume of the ringing sound is placed on the upper left part of housing 10.

Also on the left portion of housing 10, a function keyboard 30 and a ten-keyboard 40 is placed. A LCD (liquid crystal display) is used for the first display device 100.

On the right side of the first display device 100, a second display device 110 is placed, and at the lower part of the second display device 110, there is a third display device 120. A vacuum fluorecent (VF) display device is used for the second display devicce 110 and third display device 120. This VF display is very bright compared to other displays, so it is easy for the dealer to read.

On the left of the display devices 110 and 120, there is a control keyboard 50 of the left handset, and placed on the lower portion of it is a menu key 55 and a sort key 56. On the right of the display devices 110 and 120, there is a control keyboard 60 of the right handset, and placed on the lower portion of it is a forward key 65 and a backward key 66.

On the lower portion of the housing 10, there is also a control keyboard 70 for the left handset.

The control keyboard 70 is comprised of a release key, a hold key, and a transfer key. On the right of the control keyboard 70, there is a control keyboard 75 of the right hand phone set.

On the upper area of the second display device 110, there are ten keys (80-1~80-10). The ten keys are divided into two groups, each group having five keys. On the lower area of the second display device 110, there are also ten keys (80-21~80-30).

On the upper area of the third display device 120, there are ten keys (80-21~80-30). On the lower area of the third display device 120, there are also ten keys (80-31~80-40).

The second display device 110 and the third display device 120 each has twenty display segments corresponding to twenty keys.

Each segment can display eight characters and each character is formed by 5×7 dots.

In the present trading telephone, 35 out of 40 segments are used for the paging for dialing. The keys used for paging are keys 80-1~80-35.

The four segments corresponding to key 80-36~80-39 are provided for incoming lines on the other line table page. The last segment corresponding key 80-40 indicates the page number of the table of paging.

Pagenation Means

The present trading telephone is provided with pagenation means.

This means comprises a memory for the name and dial number of lines and control unit.

In the memory, lines are mapped on pages.

The basic unit of the present trading telephone can hold ten pages of line tables. It can memorize 35 dial numbers in one page, so it is possible to register 350 dial numbers in total.

The trader uses the ten-keyboard 40 to indicate the desired page of the table on the second display device 110 and the third display device 120. The forwarding and backwarding of the pages could be done by the FWD key 65 and the BACK key 66.

On the display devices 110 and 120, 35 names can be indicated. Therefore, the trader can access directly to the telephone number that he wants to call by pressing line key 80-n (n=1~35) which corresponds to the display segment where the desired name is indicated. The line key 80-n (n=1~35) will start flashing when there is an incoming call on the page that is indicated on the display device.

On hold line handling

FIG. 7–FIG. 10 shows how the incoming calls on the other pages are held.

On the third display device 120, display segment 90-36–90-39 are provided for incoming calls. When a new incoming call is received, the bell rings and the name of the caller is displayed on the segment. At the same time, the key corresponding to the segment starts flashing.

Each key has a multi-color light emitting diode. When the left handset is busy, the green light will be on, and when the right handset is busy, the orange light will be on.

When the left hand set is on hold, the green light flashes slowly, and when the right hand set is on hold, the orange light will flash slowly.

When a line is occupied in the other trading system, a red light is on, and when it is on hold, the red light keeps flashing. Also, when a direct line is coming in, the red light flashes quickly, and when a dial-in line is coming in, the green light flashes quickly.

By the multi-color lighting system, the trader can understand the line condition very easily.

Figure 7:
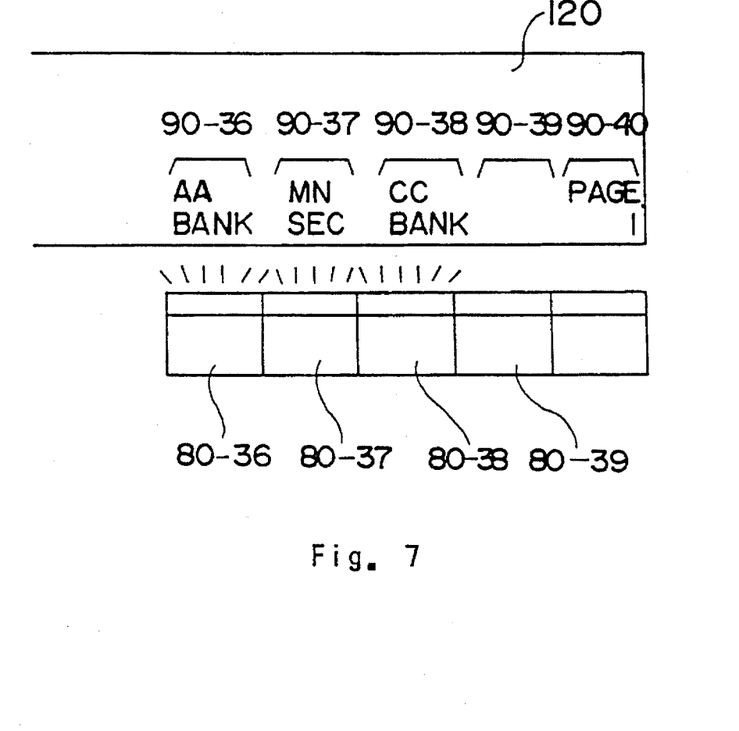
FIG. 7 shows a part of the display device and line selecting keys.

FIG. 7 shows three incoming calls (AA BANK, MN SECURITIES, CC BANK) on hold. In the present trading telephone, up to four incoming lines could be displayed at once.

Figure 8:
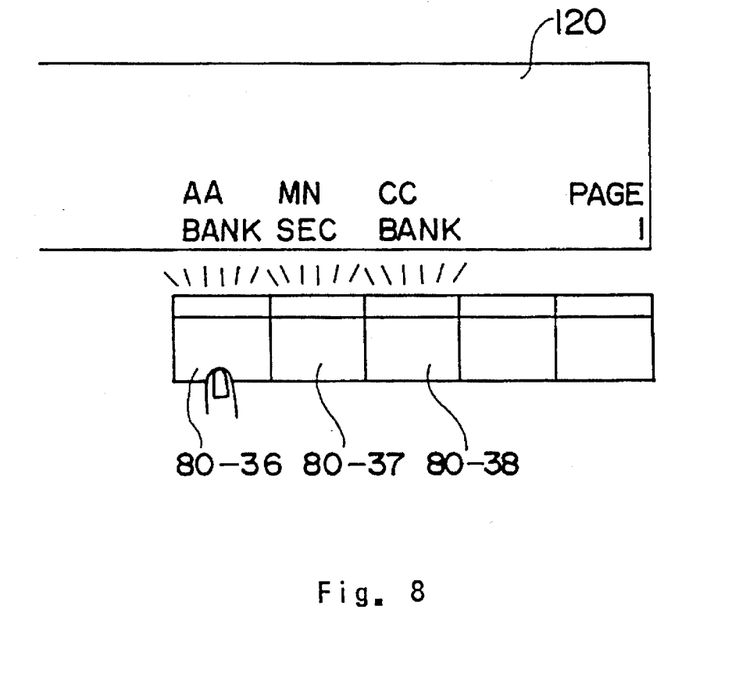
FIG. 8 shows an operation to pick up one of the on-hold incoming lines.
Figure 9:
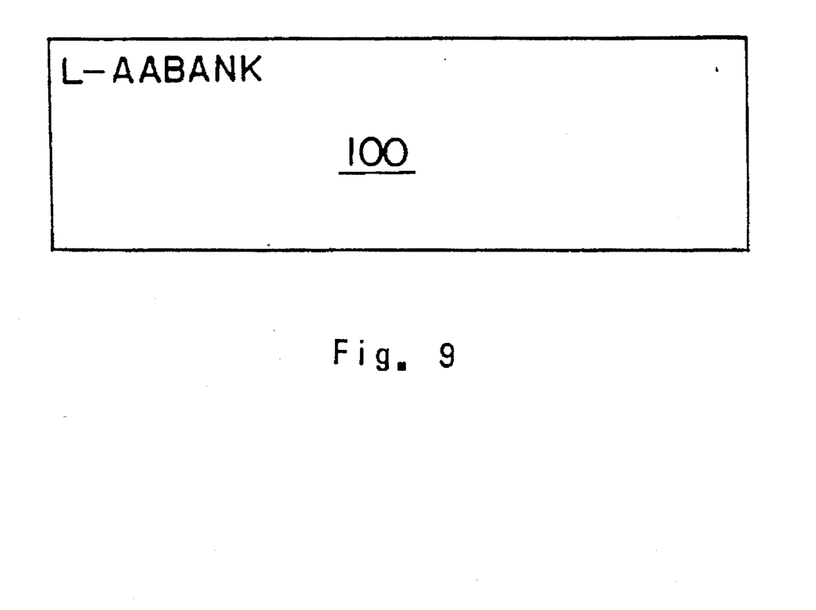
FIG. 9 shows the first display device with busy line status information.

To take the line on hold, simply push down the corresponding key. FIG. 8 shows the way to take the line from AA BANK; press the key 80-36. When the line from AA BANK is taken, the data is transferred to the first display device 100 as is shown in FIG. 9. "L- AA BANK" indicates that AA BANK is on the left handset. After the data is transferred from the third display device 120 to the first display device 100, the segment 90-36 in the third display device 120 is cleared, and the flashing of the key 80-36 is off.

Figure 10:
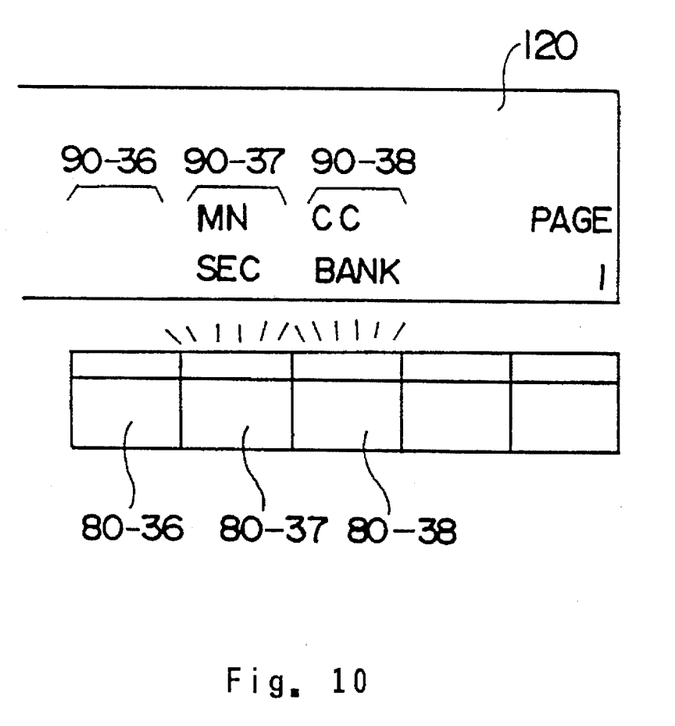
FIG. 10 shows a part of the display device and line selecting keys.
Figure 11:
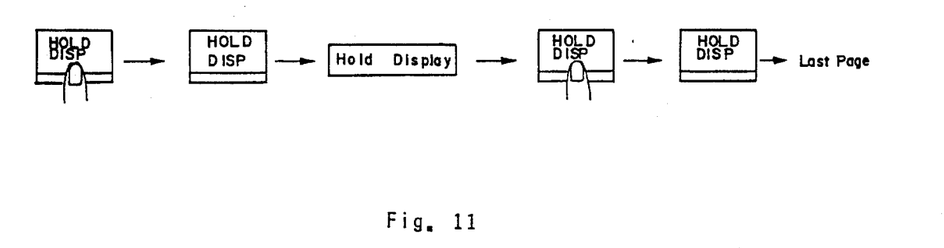
FIG. 11 shows a flow of the operation.

The segment 90-36 is kept blank before the "SORT" key 56 is pressed. By pushing the "SORT" key 56, the blank segment is filled with the waiting incoming calls.

FIG. 11–FIG. 15 show the other way to handle calls on hold. When incoming calls are on hold, "HOLD DISP" key in the function keyboard 30 flashes green light. By pressing the key, the green light will be turned on, and the second display device 110 and the third display device 120 will change to on-hold calls display mode.

Figure 12:
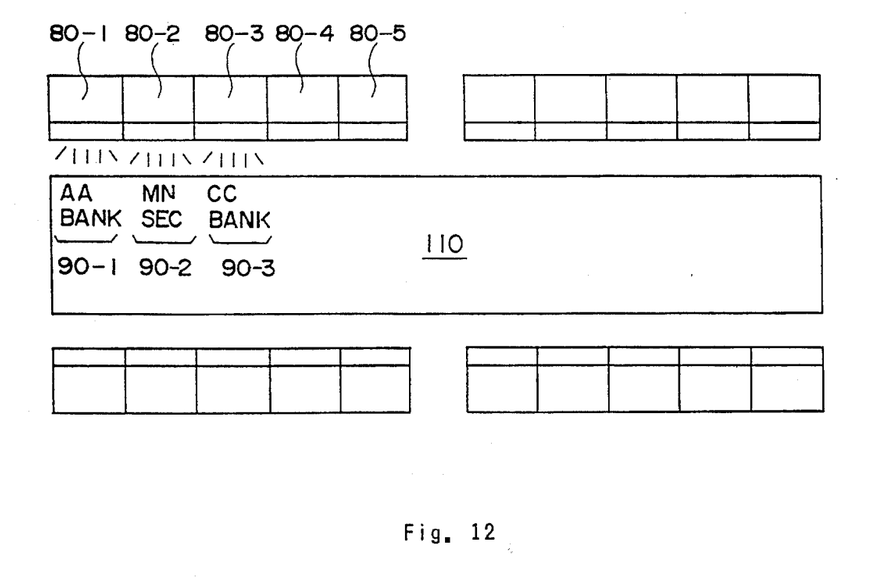
FIG. 12 shows the first display device with on-hold incoming lines information.
Figure 13:
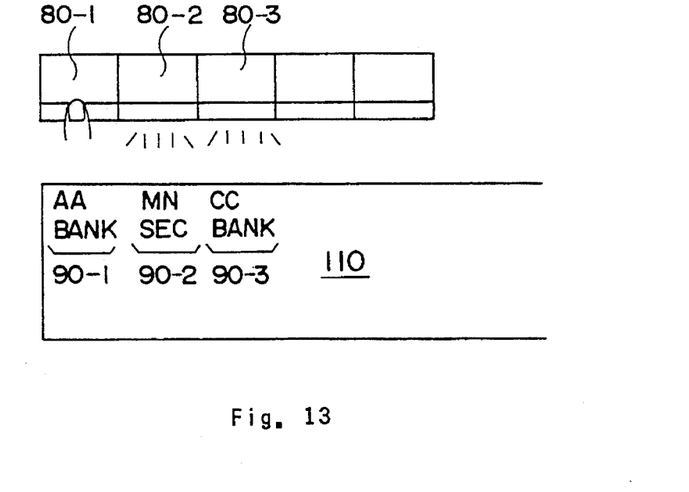
FIG. 13 shows an operation to pick up one of the on-hold incoming lines.

As shown in FIG. 12, all the held calls are indicated on the second display device 110 and the third display device 120. To take the calls on hold, simply press the key 80-n (n=1~) as is shown in FIG. 13.

Figure 14:
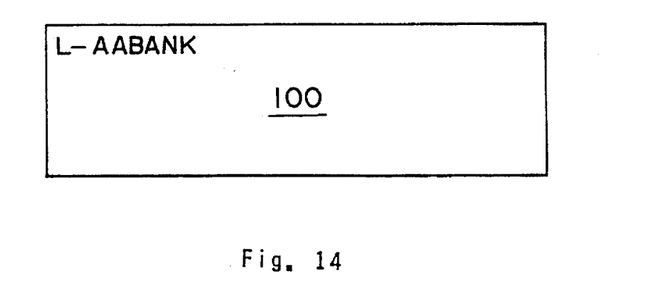
FIG. 14 shows the first display device with busy line status information.

The data of the taken line (in this ease, AA BANK) is transferred to the first display device 100 as is shown in FIG. 14. This drawing means that the incoming call from AA BANK is taken on the left hand phone set.

Figure 15:
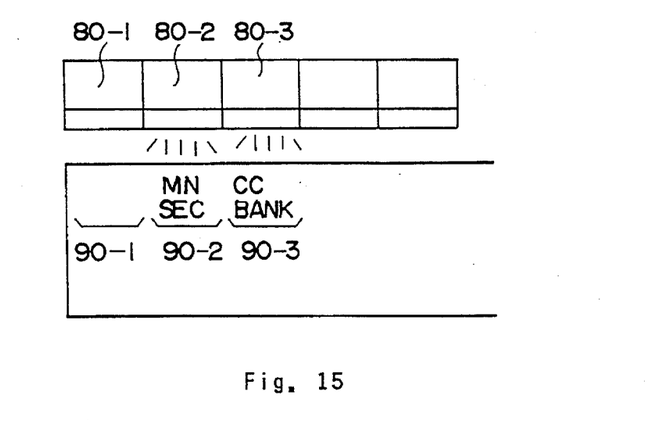
FIG. 15 shows a part of the display device and the line selecting keys.

When the data is transferred to the first display 100, the data on the segment 91-1 is cleared, and the flashing light of the key 80-1 is turned off, as is shown in FIG. 15. By pressing the "HOLD DISP" key emitting green light, the second display device 110 and the third display device 120 are turned back to the paging mode. If there are incoming calls still on hold, the "HOLD DISP" key will keep flashing, but otherwise the light of the key is turned off.

The present trading system has these further functions.

Automated Power Off

When no calls or key operation is done for a predetermined time, the power of the trading system is turned off automatically for saving energy and for security. The predetermined time can be set by the trader.

Password Security System

The present trading telephone has a double password protection.

User password: Each user (trader) is given his own password. By that password, the user can access to the individual program of the trading system. The access to the program is limited by each user's position.

System Manager Password: The system manager is given authority to access to all the programs of the trading system.

Memory Card Expansion Memory

The present trading telephone has a hard memory with the capacity of 350 calls. By inserting a memory card, additional 1050 calls can be memorized in the trading telephone.

User Programming Mode

The user can input line names and line numbers by selecting user programming mode by "PGM" key and "ENT" key in the function keyboard 30.

Option

As described hereinbefore, the basic unit of the present trading system has these elements and functions.

Figure 16:
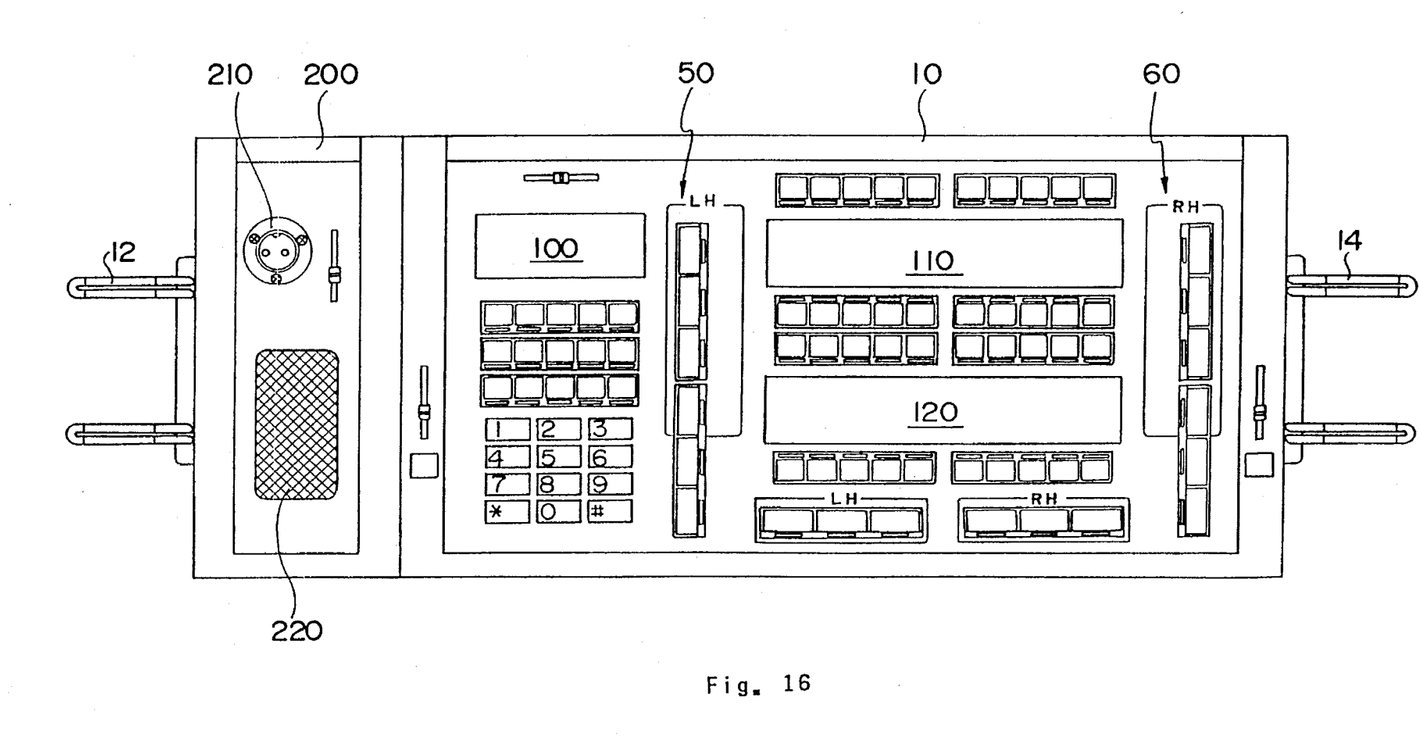
FIG. 16 is a plan view of the other embodiment of the trading telephone in accordance with the invention.
Figure 17:
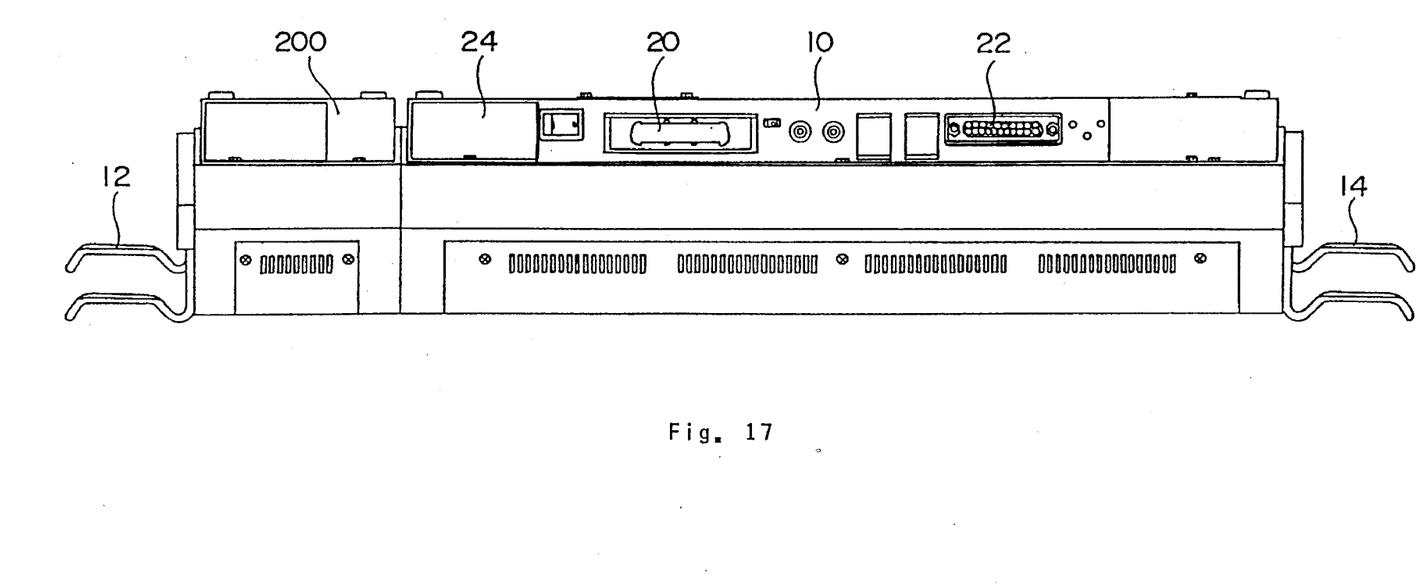
FIG. 17 is a back view of the trading telephone in accordance with the invention.

FIG. 16 and FIG. 17 show the trading telephone comprised of the basic unit and the option unit.

In the trading telephone, a microphone unit 200 is connected to the left hand side of the basic unit housing 10.

This microphone unit 200 is provided with a connecting plug 210 and a speaker 220. By connecting a conventional microphone to the plug 210, user can send voice communication through the microphone, instead of the hand held telephone set. Through the speaker 220, user can hear the caller's voice. Using this unit, user can communicate without using hands.

A hook 12 for left hand telephone set may be installed on the left side of the unit 200.

We claim:

1. A trading telephone system comprising:

a plurality of telephones;

a line control unit having trunks connected to at least one public line and to at least one direct-in line for establishing connection of a respective one of the plurality of telephones with at least one of the at least one public line and the at least one direct-in line, the line control unit having trunks connected to an interphone line for establishing connection of a respective one of the plurality of telephones with at least another one of the plurality of telephones;

wherein each of the plurality of telephones include a keyboard, a first display device for displaying engaged line information, a second display device divided into sectors for displaying line names having corresponding line selection keys, a third display device divided into sectors for displaying line names having corresponding line selection keys, and pagenation means having at least one memory for storing information of line names and dialing numbers on a first plurality of pages and a control unit for at least controlling read out of information from the pagenation means for display, the at least one memory of the pagenation means storing incoming line information on a second plurality of pages, a plurality of the sectors of the third display device and the corresponding line selection keys of the third display device enabling display of the incoming line information.

2. A trading telephone system according to claim 1, wherein the third display device displays an incoming line name on one of the plurality of sectors with a key being lighted to inform of an on-hold incoming call, the incoming name being cleared from the one sector and the lighting of the key being turned off when the line on-hold is connected.

3. A trading telephone system according to claim 1, wherein the telephone further comprises two lines for a left hand phone set and a right hand phone set, and a line key having a multi-color light emitting diode for indicating that the left hand phone set or the right hand phone set is busy with different colored lights.

4. A trading telephone system according to claim 3, wherein the light emitting diode of the line key flashes with different frequencies in dependence on a line condition of the phone set.

5. A trading telephone system according to claim 1, wherein the keyboard is provided with function keys for enabling changing of pages of the pagenation means.

6. A trading telephone system according to claim 1, further comprising means for disconnecting power after a predetermined period of time of nonoperation.

7. A trading telephone system according to claim 1, further comprising password security means for enabling accessing to service only in response to inputting of at least one password.

8. A trading telephone system according to claim 7, wherein the at least one password includes a trader-password for traders and a system password for system managers.

9. A trading telephone system according to claim 1, wherein the pagenation means further includes a memory card for expanding the number of pages of the pagenation means.

10. A trading telephone system according to claim 1, further comprising means for registering a name and dialing number thereof in the pagenation means in response to operation of function keys of the keyboard.

11. A trading telephone system comprising:

a plurality of telephones;

a line control unit having trunks connected to at least one public line and trunks connected to at least one direct-in line for establishing connection of a respective one of the plurality of telephones with at least one of the at least one public line and the at least one direct-in line, the line control unit having trunks connected to an interphone line for establishing connection of a respective one of the plurality of telephones with another one of the plurality of telephones;

wherein each of the plurality of telephones include a keyboard, a first display device for displaying engaged line information, a second display device divided into sectors for displaying line names having corresponding line selection keys, a third display device divided into sectors for displaying line names having corresponding line selection keys, and pagenation means having at least one memory for storing information of line names and dialing numbers on a first plurality of pages and a control unit for at least controlling read out of information from the pagenation means for display, the keyboard having function keys and the telephone having an on-hold line display mode, at least one of the first display device, the second display device and the third display device indicating incoming calls on-hold in response to operation of the function keys.

12. A trading telephone system according to claim 11, wherein the function keys of the keyboard enable sorting of the on-hold incoming calls.

13. A trading telephone system according to claim 11, wherein the telephone further comprises two lines for a left hand phone set and a right hand phone set, and a line key having a multi-color light emitting diode for indicating that the left hand phone set or the right hand phone set is busy with different colored lights.

14. A trading telephone system according to claim 12, wherein the light emitting diode of the line key flashes with different frequencies in dependence on a line condition of the phone set.

15. A trading telephone system according to claim 11, wherein the keyboard is provided with function keys for enabling changing of pages of the pagenation means.

16. A trading telephone system according to claim 11, further comprising means for disconnecting power after a predetermined period of time of nonoperation.

17. A trading telephone system according to claim 11, further comprising password security means for enabling accessing to service only in response to inputting of at least one password.

18. A trading telephone system according to claim 17, wherein the at least one password includes a trader-password for traders and a system password for system managers.

19. A trading telephone system according to claim 11, wherein the pagenation means further includes a memory card for expanding the number of pages of the pagenation means.

20. A trading telephone system according to claim 11, further comprising means for registering a name and dialing number thereof in the pagenation means in response to operation of function keys of the keyboard.

* * * * *